United States Patent
Gansley et al.

(10) Patent No.: US 6,638,342 B2
(45) Date of Patent: Oct. 28, 2003

(54) PROCESS AND FACILITY FOR REMOVING METAL CONTAMINANTS FROM FERTILIZER STREAMS

(75) Inventors: Raymond R. Gansley, Lebanon, PA (US); Michael T. Hammer, Birdsboro, PA (US); Michael L. Mengel, Fredericksburg, PA (US)

(73) Assignee: Marsulex Environmental Technologies, Lebanon, PA (US)

( * ) Notice: Subject to any disclaimer, the term of this patent is extended or adjusted under 35 U.S.C. 154(b) by 70 days.

(21) Appl. No.: 09/996,201

(22) Filed: Nov. 28, 2001

(65) Prior Publication Data

US 2003/0097862 A1 May 29, 2003

(51) Int. Cl.[7] .............................. B01D 53/14; C05G 1/00
(52) U.S. Cl. .............................. 95/189; 71/31; 95/195; 95/205; 95/235; 95/236; 96/234; 423/243.06
(58) Field of Search .................. 71/31; 423/243.06; 95/189, 190, 195, 196, 197, 205, 235, 236; 96/234, 235, 236, 237, 238, 239, 240

(56) References Cited

U.S. PATENT DOCUMENTS

| | | | | |
|---|---|---|---|---|
| 3,637,347 A | * | 1/1972 | Jonakin et al. |
| 4,039,304 A | * | 8/1977 | Bechtold et al. |
| 4,073,634 A | * | 2/1978 | Pircon et al. |
| 4,119,538 A | * | 10/1978 | Yamauchi et al. |
| 4,168,150 A | * | 9/1979 | Pircon et al. |
| 4,252,553 A | * | 2/1981 | Pircon et al. |
| 4,541,999 A | * | 9/1985 | Bechtold et al. |
| 4,617,180 A | * | 10/1986 | Vogg |
| 4,690,807 A | * | 9/1987 | Saleem |
| RE33,031 E | * | 8/1989 | Morrison |
| 5,009,793 A | | 4/1991 | Muller |
| 5,362,458 A | * | 11/1994 | Saleem |
| 5,510,094 A | * | 4/1996 | Bhat et al. |
| 5,624,649 A | * | 4/1997 | Gal |
| 6,027,543 A | | 2/2000 | Yoshizaki et al. |
| 6,063,352 A | | 5/2000 | Risse |
| 6,066,304 A | * | 5/2000 | Freetly et al. |
| 6,077,439 A | | 6/2000 | El-Ammouri et al. |
| 6,096,223 A | | 8/2000 | El-Shoubary et al. |
| 6,110,370 A | | 8/2000 | Van Hille et al. |
| 6,110,379 A | | 8/2000 | Overton et al. |
| 6,139,753 A | | 10/2000 | Taylor |
| 6,344,066 B1 | * | 2/2002 | Eyal |
| 6,531,104 B1 | * | 3/2003 | Borio et al. |
| 6,569,395 B1 | * | 5/2003 | Fujimura et al. |
| 2003/0097862 A1 | * | 5/2003 | Gansley et al. |

FOREIGN PATENT DOCUMENTS

| | | |
|---|---|---|
| AT | 400010 | 9/1995 |
| EP | 0263776 | 4/1988 |
| FR | 2731421 | 9/1996 |

* cited by examiner

Primary Examiner—Duane S. Smith
(74) Attorney, Agent, or Firm—Gary M. Hartman; Domenica N. S. Hartman; Hartman & Hartman, P.C.

(57) ABSTRACT

A process and system for producing fertilizers with reduced levels of contaminants, and particularly a flue gas scrubbing process and facility that produce a fertilizer byproduct which is treated to remove heavy metals originally present in the scrubbed flue gas. The process entails contacting a flue gas with a scrubbing solution to remove acidic gases and produce a byproduct containing a fertilizer compound precipitate and dissolved metals and/or metal compounds. A fertilizer solution containing dissolved fertilizer and dissolved metals and/or metal compounds is then produced by adding water to the byproduct, after which the pH of the fertilizer solution is adjusted one or more times with a gaseous and/or liquid alkali to form precipitates of one or more metal species. The precipitates are then removed from the fertilizer solution and the solution dewatered to yield a fertilizer product with lower contaminant levels.

22 Claims, 1 Drawing Sheet

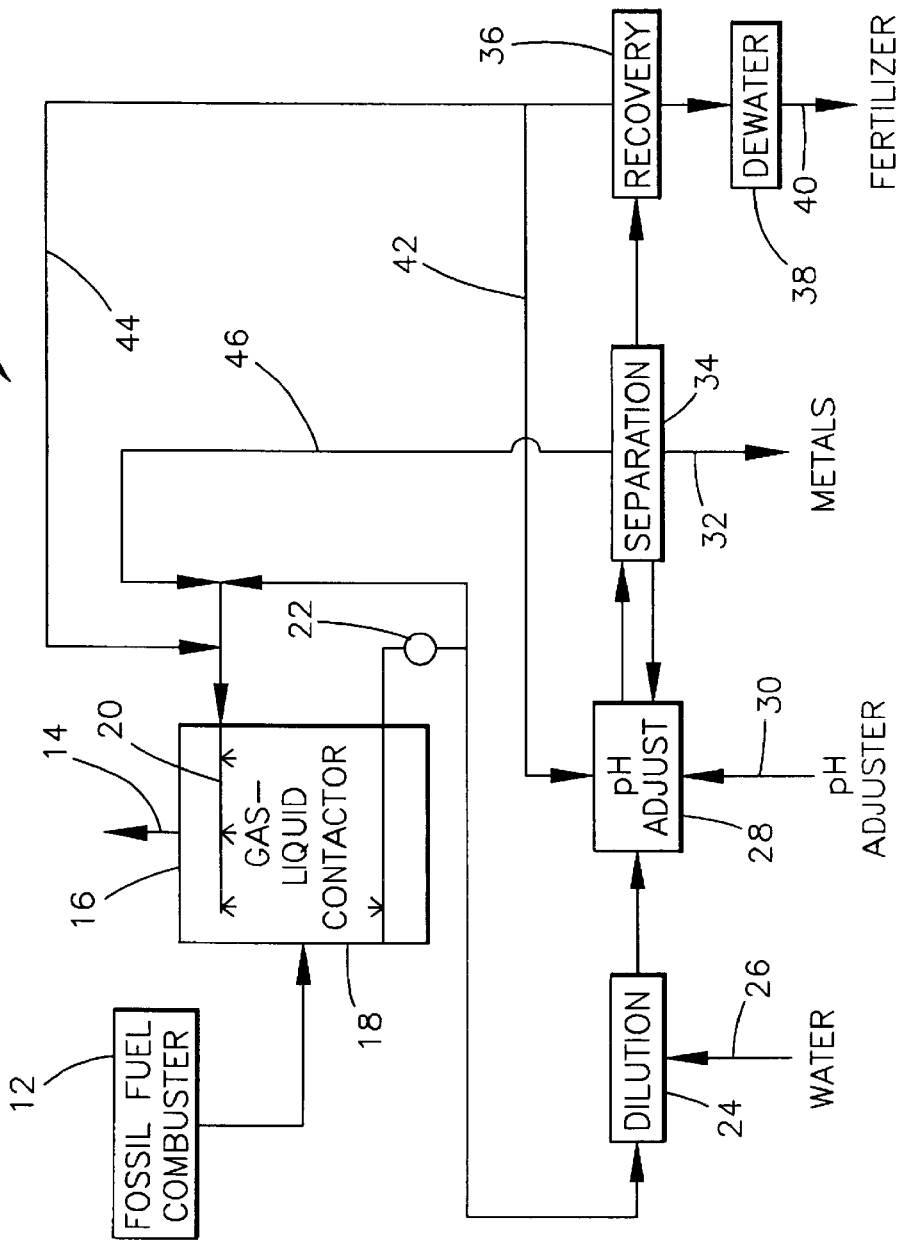

PROCESS AND FACILITY FOR REMOVING METAL CONTAMINANTS FROM FERTILIZER STREAMS

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

This invention generally relates to methods of producing fertilizers. More particularly, this invention is directed to a process for removing dissolved metals and metal compounds from an aqueous fertilizer solution, such as ammonium sulfate fertilizer produced as a byproduct of a flue gas desulfurization (FGD) process in which an ammonium sulfate solution is used to absorb sulfuric acid from a flue gas.

(2) Description of the Related Art

Agricultural fertilizers are mined as well as produced in processes in which the fertilizer may be the primary product or a byproduct of the process. Depending on their source, fertilizers may contain contaminants such as metals and particularly heavy metals (e.g., iron, chromium, lead, zinc, copper, nickel, cadmium, etc.) in the form of molecules (metal compounds) or ions from the dissociation of compounds of these metals, e.g., sulfides, hydroxides, etc. High heavy metal contents in fertilizers are undesirable as posing a health risk to humans and the environment. Because fertilizers are marketed with specifications that describe many of the physical characteristics of these products, including metal content, a sufficiently high heavy metal content can negatively affect product value. Some heavy metals, iron particularly, can also undesirably effect the color of the fertilizer product, further reducing product value.

To limit contaminants, mined fertilizers are often selectively mined from certain parts of the deposit seam. For example, potassium chloride has been mined by a process known as solution mining, in which water is injected to dissolve an underground deposit of potassium chloride, after which the solution is pumped to the surface for product recovery. To improve product quality, a mechanical separation technique may be used to remove contaminants. However, various compounds of heavy metals are soluble in aqueous solutions of fertilizers, and therefore cannot be removed by filtering or other standard separation methods.

Contaminant levels in fertilizers produced by chemical processes, such as the production of ammonium sulfate through the reaction of ammonia and sulfuric acid, are typically controlled by the selection or treatment of the reagent feedstocks, though heavy metal contaminants may still be present in these fertilizer products. On the other hand, fertilizers produced as a byproduct of a process may have contaminants from the various streams involved in the process, and from the corrosion of the materials used in the construction of the process facility. An example is the production of ammonium sulfate and ammonium nitrate fertilizers and, with secondary processing, potassium sulfate and potassium nitrate fertilizers, as byproducts of flue gas desulfurization (FGD) systems (scrubbers) that remove acidic gases such as sulfur dioxide ($SO_2$), hydrogen chloride (HCl) and hydrogen fluoride (HF) from flue gases produced by power plants or other combustion sources. Fertilizer byproducts produced by FGD processes are typically in the form of an aqueous slurry containing precipitates of the fertilizer compound, as well as contaminants that were present in the flue gas, particularly as a result of the various metal oxides that are present in the fly ash and then transferred at least in part to the fertilizer stream. The control of contaminants in fertilizers produced by FGD has been typically through the removal of fly ash from the flue gas stream, and by filtering or other mechanical separation of the fertilizer solution. However, heavy metal compounds typically present in the fertilizer byproduct of FGD are often dissolved, and therefore cannot be removed by filtering or mechanical separation. While contaminated waste water streams from mining sites have used lime (CaO) to adjust the pH of the waste water, causing the precipitation of metals from the stream, the use of lime is not appropriate for FGD processes because lime reacts to form calcium salts that are not desirable as fertilizers. Also, as a solid, lime is not convenient as an addition to treat contaminated fertilizers.

In view of the above, it would be desirable if a method were available that could reduce the metal content of fertilizer products, and particularly fertilizer byproducts of FGD processes, to a level that will essentially eliminate the risk to humans and the environment, as well as enhance the value of the fertilizer.

BRIEF SUMMARY OF THE INVENTION

The present invention provides a process and facility for producing fertilizers with reduced levels of contaminants as a result of the fertilizer stream being treated to precipitate undesirable metals. The invention is particularly directed to flue gas scrubbing systems that produce a useful fertilizer byproduct, in which the fertilizer byproduct is treated to remove heavy metals originally present in the scrubbed flue gas.

The process of this invention generally entails contacting a flue gas with a scrubbing solution to remove acidic gases from the flue gas and produce a byproduct containing a fertilizer compound (dissolved or precipitates) and dissolved metals and/or metal compounds. If fertilizer compound precipitates are present, water is added to the byproduct to dissolve the precipitates, such that the byproduct is a fertilizer solution containing dissolved fertilizer and dissolved metals and/or metal compounds. The pH of the fertilizer solution is then adjusted with a gaseous and/or liquid alkali to form precipitates of one or more metal species, i.e., metal precipitates or compounds of the metals. The pH of the solution is adjusted with ammonia or another alkali that will not contaminate the fertilizer byproduct and is generally compatible with the flue gas scrubbing process. Multiple pH adjustments are preferred to selectively precipitate individual metal species from the fertilizer solution, generally in a pH range of about 7 to 12. Depending on the chemistry of the dissolved fertilizer compound, the treatment of the fertilizer solution with an acid such as sulfuric acid or hydrochloric acid is also within the scope of the invention for the purpose for decreasing the pH of the fertilizer solution to a level necessary to precipitate compounds of particular metal species. The precipitates can then be removed from the fertilizer solution by known filtering or mechanical separation methods.

A flue gas scrubbing facility configured to perform the above process generally comprises a gas-liquid contactor or other suitable means for contacting a flue gas with the scrubbing solution, such that acidic gases are removed from the flue gas. Suitable vessels or other means are also provided with which the fertilizer solution is formed, the pH of the fertilizer solution is adjusted with the gaseous and/or liquid alkali to form the precipitates of the metal specie(s), and the precipitates are then removed from the fertilizer solution.

In view of the above, the present invention provides a process and facility that are capable of significantly reducing the metal content of fertilizers, and particularly fertilizer byproducts produced by flue gas scrubbing operations, such that such operations are able to produce a useful byproduct that is safer for the environment. The invention achieves this result by dissolving the fertilizer compound of the byproduct, such that a solution is formed containing dissolved fertilizer compound as well as dissolved compounds of the metals that are desired to be removed. Accordingly, an important aspect of the invention is the solubility of the particular fertilizer compound (e.g., ammonium sulfate, ammonium nitrate, potassium sulfate, potassium nitrate or potassium chloride) in the presence of the agent (e.g., dissolved ammonia) used to precipitate the metals. In general, higher ammonia concentrations reduce the solubility of these fertilizers, such that judicious use of the precipitation agent is required to avoid significant precipitation of fertilizer that would then be lost in the process of separating the metal precipitates from the fertilizer solution. Finally, the precipitation agent should be recoverable from the fertilizer solution, an acceptable constituent of the fertilizer byproduct, or compatible with the flue gas scrubbing solution so as to allow a portion of the fertilizer solution to be returned with the added precipitation agent to the scrubbing process. In view of these considerations, ammonia is a particularly preferred agent for precipitating metals for fertilizer solutions. A suitable method for recovering ammonia from a fertilizer solution would entail stripping the ammonia and returning the ammonia to the pH adjustment step. Alternatively, some or all of the stripped ammonia may be returned to the scrubbing process, as can be some or all of the ammonia-rich fertilizer solution if the scrubbing solution employs ammonia.

Other objects and advantages of this invention will be better appreciated from the following detailed description.

BRIEF DESCRIPTION OF THE DRAWINGS

The present invention will now be described, by way of example, with reference to FIG. 1, which is a schematic representation of a flue gas scrubbing facility configured in accordance with the present invention.

DETAILED DESCRIPTION OF THE INVENTION

FIG. 1 schematically illustrates a flue gas scrubbing facility 10 that has been modified in accordance with the teachings of this invention. The facility 10 is generally of the type that scrubs flue gases produced by the burning of fossil fuels, and as a result contain acidic gases such as sulfur dioxide, hydrogen chloride, and/or hydrogen fluoride. The conventional components of the facility 10 include a combustion source 12 of the flue gas and a gas-liquid contactor 16 that employs an alkaline contact medium, referred to as a scrubbing slurry or solution 18, to scrub the flue gas, which is then released to atmosphere through a suitable structure 14, which may include a chimney, demister, and other appropriate equipment. The solution 18 is shown as being delivered with a pump 22 to a contact region of the contactor 16, where the solution 18 is dispersed with spray nozzles 20 or another suitable delivery device. As with many existing flue gas scrubbing facilities, the contactor 14 is preferably equipped for in situ forced oxidation of the solution 18 that has collected at the lower end of the contactor 14. In this manner, the reaction product of contacting the acidic gases of the flue gas with the solution 18 is oxidized, which in the present invention yields a useful fertilizer byproduct. A particular example is ammonia-based scrubbing processes taught by commonly-assigned U.S. Pat. Nos. 4,690,807 and 5,362,458. In these processes, acidic gases present in a flue gas are absorbed by an ammonium sulfate solution containing ammonia, after which the absorbed sulfur dioxide reacts with the ammonia to form ammonium sulfite $(NH_4)_2SO_3$ and ammonium bisulfite $(NH_4HSO_3)$, which are then oxidized in the presence of sufficient oxygen to form precipitates of ammonium sulfate and ammonium bisulfate $(NH_4HSO_4)$. Ammonium bisulfate undergoes a second reaction with ammonia to form additional ammonium sulfate precipitate. A portion of the ammonium sulfate precipitate is then removed, dewatered and sold as a valuable fertilizer.

Ammonium nitrate is also created when flue gases containing nitrogen dioxide are scrubbed with an ammonium sulfate solution. The amount of ammonium nitrate created is usually much lower than ammonium sulfate due to the relatively low levels of nitrogen dioxide in typical flue gases as compared to sulfur dioxide. If so desired, the ammonium sulfate and nitrate created in the above manner can undergo secondary processing to produce potassium sulfate and potassium nitrate, as is known in the art.

In the use of the processes discussed above, any heavy metals present in the flue gas, whether the result of the fuel used or contamination from the combustion source 12 or contactor 16, will also be present in the solution 18 and therefore present in the fertilizer byproduct of the scrubbing operation. According to the present invention, heavy metals are removed from the fertilizer byproduct by diverting the byproduct to a dilution tank 24, where water is introduced as necessary through appropriate piping 26 to dissolve at least some, and preferably all, of the fertilizer precipitates, forming an aqueous fertilizer solution. For example, if an ammonia-based scrubbing process of the type taught by U.S. Pat. Nos. 4,690,807 and 5,362,458 is used, sufficient water is preferably added to reduce the concentration of ammonium sulfate in the fertilizer solution to 40 weight percent or less for an ammonium concentration of about 5 weight percent and a solution temperature of about 25° C. The pH of the fertilizer solution, containing both dissolved fertilizer compound and the metal compounds originally dissolved in the scrubbing solution 18, is then altered by the addition of a gaseous or liquid alkali, represented as being introduced via a pipe 30 into an adjustment tank 28. Those skilled in the art will appreciate that dilution of the fertilizer byproduct and pH adjustment of the fertilizer solution could be performed in a single vessel. Once the pH of the fertilizer solution is appropriately adjusted to precipitate a metal species from the solution, the resulting metal precipitates are removed. The removal of metal precipitates is represented in FIG. 1 as being performed with a separation device 32, such as a filter or any other suitable mechanical separation apparatus. The metal precipitates are withdrawn from the separation device 32 through an outlet 34, after which additional pH adjustments can be performed in the tank 28. Such adjustments may be made by further additions of alkali or the addition of an acid that is compatible with the fertilizer solution and desired fertilizer byproduct. With each pH adjustment, the fertilizer solution is again passed through the separation device 32 to remove the precipitated metal specie. The pH adjustment and separation steps can be repeated as desired until the targeted metal contaminants have been removed from the fertilizer solution, after which the remaining solution is transferred to a recovery tank 36 where the alkali originally added to the solution in the adjustment tank 28 is removed. Thereafter, the fertilizer compound is reprecipitated by the removal of water in a dewatering apparatus 38, from which the desired fertilizer (precipitate) is removed via an outlet 40.

In view of the above, the invention entails adjusting (if required) the concentration of water in a scrubbing solution 18 to ensure fertilizer compound precipitates are dissolved, such that an aqueous fertilizer solution exists whose pH is adjusted to various levels to precipitate unwanted metal species that were dissolved in the original scrubbing solution 18 as a result of the scrubbing operation, but without precipitating the fertilizer compound. Therefore, an important aspect of this process is the solubility behavior of the fertilizer compound in the presence of the agent used to adjust the pH of the fertilizer solution. Ammonia is a preferred agent for adjusting pH, particularly if the scrubbing solution 18 contains ammonium sulfate, which as discussed above utilizes ammonia to form additional ammonium sulfate precipitates. In general, as the concentration of dissolved ammonia increases in the aqueous fertilizer solution, the solubilities of fertilizer compounds such as ammonium sulfate, potassium sulfate and potassium chloride decrease. Because of this solubility behavior of fertilizers in the presence of ammonia, the degree of dilution of the fertilizer solution must take into account the solubility effect of ammonia so that fertilizer compound does not precipitate to any significant extent during pH adjustment. Consequently, the amount of ammonia (or other pH-adjusting agent) added to the adjustment tank 28 should be carefully controlled to avoid the precipitation of any significant amount of fertilizer compound, which would be subsequently lost in the separation process performed with the separation device 32. In some instances, it may be desirable or necessary to raise the temperature of the fertilizer solution in order to increase the solubility of the fertilizer compound. Those skilled in the art will appreciate that each of the above-noted factors should be considered when implementing the present invention in order to avoid significant precipitation of fertilizer compound prior to the dewatering step of this invention.

In most situations, the fertilizer solution will require an increase in pH to reach levels at which metal species will precipitate. For example, the pH of an ammonium sulfate scrubbing solution is typically maintained at a pH of about 5 to about 6 in order to efficiently absorb acidic gases. The desired alkali, preferably ammonia, is then be added to increase the pH level to target specific contaminants for the particular application. For example, the ferrous form of iron tends to precipitate more readily at a pH of about 7 to 8, while the ferric form of iron is best precipitated in the pH range of about 10 to 11. Chromium is most effectively precipitated in the pH range of about 8 to 9, while lead, zinc and copper precipitate well in the pH range of about 8.5 to 9.5, nickel tends to precipitate well in the pH range of about 9.5 to 11, and cadmium precipitates well in the range of about 10.5 to 12. Other metals will have different target ranges, and in general some degree of precipitation of each metal could be achieved for pH values greater or lesser than the stated ranges. In cases where the pH must be decreased to precipitate a given metal, an acid is introduced into the solution that is compatible with the fertilizer byproduct, for example, sulfuric acid if the process byproduct is a sulfate-based fertilizer such as ammonium sulfate or potassium sulfate, and hydrochloric acid if the byproduct is a chloride-rich fertilizer such as potassium chloride. Finally, one skilled in the art may choose to adjust the fertilizer solution to one or more pH values that are able to precipitate more than one metal specie present, thereby simplifying the process and system.

Ammonia added to raise the pH of the fertilizer solution can be recovered by an ammonia stripping process applied to the fertilizer solution in the recovery tank 36, and thereafter returned via a pipe 42 to the adjustment tank 28 and/or delivered to the contactor 16 via a pipe 44. Alternatively, the fertilizer solution with the added ammonia (i.e., the fertilizer solution remaining in the separation tank 32) can simply be returned to the contactor 16, as shown by a pipe 46 in FIG. 1. A combination of these techniques may also be used.

In view of the above, it can be appreciated that the present invention is particularly advantageous for use in flue gas scrubbing operations in which ammonia is used in the production of ammonium sulfate fertilizer. In the past, ammonium sulfate fertilizer produced as a byproduct of FGD processes has contained levels of heavy metals that may be unacceptable from an environmental or economical standpoint. The process of this invention removes such contaminants to enhance the value of the fertilizer product.

While the invention has been described in terms of a preferred embodiment, it is apparent that other forms could be adopted by one skilled in the art. For example, while the invention has been particularly described in reference to a flue gas desulfurization process in which an ammonium sulfate solution containing ammonia is used as the scrubbing solution and ammonia is used to adjust the pH of the aqueous fertilizer solution, the use of other scrubbing solutions and pH adjusting agents are within the scope of this invention. Accordingly, the scope of the invention is to be limited only by the following claims.

What is claimed is:

1. A flue gas scrubbing process in which a flue gas containing acidic gases and metals and/or metal compounds is contacted with an ammonium sulfate solution to absorb sulfur dioxide and produce a byproduct containing ammonium sulfate precipitate and dissolved metals and/or metal compounds, the method comprising the steps of:

produce an aqueous fertilizer solution containing dissolved ammonium sulfate and dissolved metals and/or metal compounds by adding water to the byproduct;

adjusting the pH of the aqueous fertilizer solution with gaseous and/or liquid ammonia to form precipitates of at least one metal specie;

removing the precipitates of the metal specie from the aqueous fertilizer solution;

adjusting the pH of the aqueous fertilizer solution with gaseous and/or liquid ammonia to form precipitates of at least a second metal specie;

removing the precipitates of the second metal specie from the aqueous fertilizer solution; and dewatering at least a portion of the aqueous fertilizer solution to precipitate ammonium sulfate.

2. A method according to claim 1, further comprising at least a third adjusting step performed before the dewatering step, in which the pH of the aqueous fertilizer solution is decreased with sulfuric acid to form precipitates of at least a third metal specie, after which the precipitates of the third metal specie are removed from the aqueous fertilizer solution.

3. A method according to claim 1, wherein the flue gas is produced by a fossil fuel combustion apparatus, and the flue gas is delivered from the fossil fuel combustion apparatus to a gas-liquid contactor where the flue gas is contacted with the ammonium sulfate solution.

4. A method according to claim 1, wherein the gaseous and/or liquid ammonia is recovered from the aqueous fertilizer solution prior to the dewatering step.

5. A method according to claim 4, wherein the gaseous and/or liquid ammonia recovered from the aqueous fertilizer solution is used in the adjusting step to adjust the pH of the aqueous fertilizer solution.

6. A method according to claim 4, wherein the gaseous and/or liquid ammonia recovered from the aqueous fertilizer solution is added to the ammonium sulfate solution for absorbing additional sulfur dioxide from the flue gas.

7. A method according to claim 1, wherein after the removing step at least a portion of the aqueous fertilizer solution is added to the ammonium sulfate solution for absorbing additional sulfur dioxide from the flue gas.

8. A flue gas scrubbing facility that produces as a byproduct a fertilizer with reduced levels of contaminants, the flue gas scrubbing facility comprising:
   means for contacting a flue gas with a scrubbing solution to remove acidic gases from the flue gas and produce a byproduct containing a fertilizer compound precipitate and dissolved metals and/or metal compounds;
   means for adding water to the byproduct in an amount sufficient to produce an aqueous fertilizer solution containing dissolved fertilizer and dissolved metals and/or metal compounds;
   means for adjusting the pH of the aqueous fertilizer solution with a gaseous and/or liquid alkali to form precipitates of at least one metal specie; and
   means for removing the precipitates of the metal specie from the aqueous fertilizer solution.

9. A flue gas scrubbing facility according to claim 8, wherein the adjusting means adds gaseous and/or liquid ammonia to the aqueous fertilizer solution to increase the pH thereof.

10. A flue gas scrubbing facility according to claim 8, wherein the adjusting means adds sulfuric acid or hydrochloric acid to the aqueous fertilizer solution to decrease the pH thereof.

11. A flue gas scrubbing facility according to claim 8, wherein the adjusting means is operable to adjust the pH of the aqueous fertilizer solution multiple times to form precipitates of multiple metal species.

12. A flue gas scrubbing facility according to claim 8, wherein the aqueous fertilizer solution comprises at least one of ammonium sulfate, ammonium nitrate, potassium sulfate, potassium nitrate, and potassium chloride.

13. A flue gas scrubbing facility according to claim 12, wherein the adjusting means adds gaseous and/or liquid ammonia to the aqueous fertilizer solution to increase the pH thereof.

14. A flue gas scrubbing facility according to claim 12, further comprising means for recovering the gaseous and/or liquid alkali from the aqueous fertilizer solution following the removing step.

15. A flue gas scrubbing facility according to claim 14, further comprising means for dewatering the aqueous fertilizer solution and reprecipitating the fertilizer compound precipitate after recovering the gaseous and/or liquid alkali from the aqueous fertilizer solution.

16. A flue gas scrubbing facility according to claim 8, wherein the scrubbing solution contains ammonium sulfate.

17. A flue gas scrubbing facility that uses an ammonium sulfate solution to absorb sulfur dioxide from a flue gas that contains metals and/or metal compounds, and which produces a byproduct containing ammonium sulfate precipitate and dissolved metals and/or metal compounds, the flue gas scrubbing facility comprising:
   means for producing an aqueous fertilizer solution containing dissolved ammonium sulfate and dissolved metals and/or metal compounds by adding water to the byproduct;
   means for adjusting the pH of the aqueous fertilizer solution with gaseous and/or liquid ammonia to form precipitates of multiple metal species;
   means for removing the precipitates of the multiple metal species from the aqueous fertilizer solution; and
   means for dewatering at least a portion of the aqueous fertilizer solution to precipitate ammonium sulfate.

18. A flue gas scrubbing facility according to claim 17, further comprising a fossil fuel combustion apparatus in which the flue gas are produced, and a gas-liquid contactor to which the flue gas is delivered from the fossil fuel combustion apparatus and where the flue gas is contacted with the ammonium sulfate solution.

19. A flue gas scrubbing facility according to claim 18, further comprising means for recovering the gaseous and/or liquid ammonia from the aqueous fertilizer solution prior to the aqueous fertilizer solution being delivered to the dewatering means.

20. A flue gas scrubbing facility according to claim 19, further comprising means for delivering the gaseous and/or liquid ammonia recovered from the aqueous fertilizer solution to the adjusting means.

21. A flue gas scrubbing facility according to claim 19, further comprising means for delivering the gaseous and/or liquid ammonia recovered from the aqueous fertilizer solution to the gas-liquid contactor.

22. A flue gas scrubbing facility according to claim 19, further comprising means for delivering at least a portion of the aqueous fertilizer solution to the gas-liquid contactor.

* * * * *